(12) United States Patent
Murphy

(10) Patent No.: US 7,980,707 B2
(45) Date of Patent: Jul. 19, 2011

(54) AUDIENCE SCANNING LASER DISPLAY PROJECTOR AND ASSOCIATED METHODS

(76) Inventor: Patrick Murphy, Orlando, FL (US)

( * ) Notice: Subject to any disclaimer, the term of this patent is extended or adjusted under 35 U.S.C. 154(b) by 977 days.

(21) Appl. No.: 11/908,679

(22) PCT Filed: Mar. 8, 2006

(86) PCT No.: PCT/US2006/008244
§ 371 (c)(1),
(2), (4) Date: Sep. 14, 2007

(87) PCT Pub. No.: WO2006/101739
PCT Pub. Date: Sep. 28, 2006

(65) Prior Publication Data
US 2008/0192981 A1   Aug. 14, 2008

Related U.S. Application Data

(60) Provisional application No. 60/662,671, filed on Mar. 17, 2005.

(51) Int. Cl.
*G03B 21/14* (2006.01)
*G06K 9/00* (2006.01)
(52) U.S. Cl. .............................. 353/97; 353/121; 353/28
(58) Field of Classification Search .................... 353/97, 353/85, 121, 122
See application file for complete search history.

(56) References Cited

U.S. PATENT DOCUMENTS

| | | | | |
|---|---|---|---|---|
| 6,002,505 A | * | 12/1999 | Kraenert et al. | 359/196.1 |
| 6,460,999 B1 | * | 10/2002 | Suzuki | 353/79 |
| 6,575,581 B2 | * | 6/2003 | Tsurushima | 353/121 |
| 6,984,039 B2 | * | 1/2006 | Agostinelli | 353/28 |
| 7,325,933 B2 | * | 2/2008 | Kaise et al. | 353/97 |

* cited by examiner

*Primary Examiner* — William C Dowling
(74) *Attorney, Agent, or Firm* — Allen, Dyer Doppelt, Milbrath & Gilchrist, P.A.

(57) ABSTRACT

An apparatus and method for an audience scanning laser display projector includes a laser projector capable of generating a laser beam output having a predetermined beam path, scan area and beam wavelength. A beam position sensor is associated with said laser projector. A camera capable of capturing an image of the audience using light of a wavelength other than the beam wavelength, is disposed relative to said laser projector so that the captured image includes the area scanned by the laser beam. A processor is operably connected with said laser projector, said beam position sensor and said camera, said processor generating a table corresponding to the camera image of the audience, and containing software capable of identifying location of faces in the audience image and comparing face locations with beam position so as to signal said laser projector to attenuate the beam when scanning over a face location.

2 Claims, 8 Drawing Sheets

AUDIENCE SCANNING LASER DISPLAY PROJECTOR AND ASSOCIATED METHODS

RELATED APPLICATION

This application claims priority from co-pending U.S. provisional application Ser. No. 60/662,671, which was filed on Mar. 17, 2005, and which is incorporated herein by reference in its entirety.

FIELD OF THE INVENTION

The present invention relates to the field of laser display projectors and, more specifically, to a laser display projector for use in audience scanning and which avoids faces detected in the audience.

BACKGROUND OF THE INVENTION

Outside of the U.S., laser beams are routinely scanned across audiences in discos, nightclubs and concerts. Experience in those countries has proven this type of laser display to be quite safe. There have been a very small number of accidents or incidents in 25 years of audience scanning. FIG. 1 is a photo of an audience in Italy being scanned with a laser, showing how these laser light shows operate.

However, in the U.S., audience scanning is not usually performed due to regulatory and legal liability concerns. In operating audience scanning laser projectors, there is a higher margin of safety required in the U.S. One way to increase safety is to have the laser scanning system detect the audience's faces, so as to turn down or turn off the laser beam while scanning those areas.

Accordingly, the present invention discloses an audience scanning laser display which is capable of detecting areas of the audience in which one or more faces are turned toward the laser projector. Once these areas have been detected, the apparatus is able to turn down the power of the beam or turn the beam off altogether when passing over a face.

SUMMARY OF THE INVENTION

With the foregoing in mind, the present invention advantageously provides an audience scanning laser display projector having the capability of detecting faces in the audience and of reducing beam power or shutting down the beam when scanning over those areas.

The present invention includes a laser projector capable of generating a laser beam output having a predetermined beam path, scan area and beam wavelength. A beam position sensor is associated with said laser projector and a camera capable of capturing an image of the audience using light of a wavelength other than the beam wavelength is disposed relative to said laser projector so that the captured image includes the area scanned by the laser beam. A processor is operably connected with said laser projector, said beam position sensor and said camera, said processor generating a table corresponding to the camera image of the audience, and containing software capable of identifying location of faces in the audience image and comparing face locations with beam position so as to signal said laser projector to attenuate the beam when scanning over a face location.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

The present invention discloses the detection of multiple faces in a crowd, even under dim or dark conditions, in real-time in an audience scanning laser display projector apparatus. The invention does not involve identifying or recognizing the faces—only detecting that a face is present at a certain location in the audience. For that reason, this invention does not necessarily require detection/extraction of facial features such as eyes, unless it is deemed preferably for the task of distinguishing between actual faces and face-like shapes. The invention is especially applicable to scanning laser beams across an audience, while avoiding their faces.

Note that in the invention it is not necessary to detect heads or people. Also, faces that are looking away from the laser need not be detected. It is only necessary that the system detect faces that are looking in the general direction of the laser projector. If a face is partially obscured or is looking away, the person cannot see the laser so it is acceptable if they are not detected.

On the other hand, it is desirable that the present invention operate conservatively, that is, it is preferred to err on the side of safety. For that reason it is better to have some false positives, for example, objects that are detected as faces, even though they are not faces.

Figure 2:
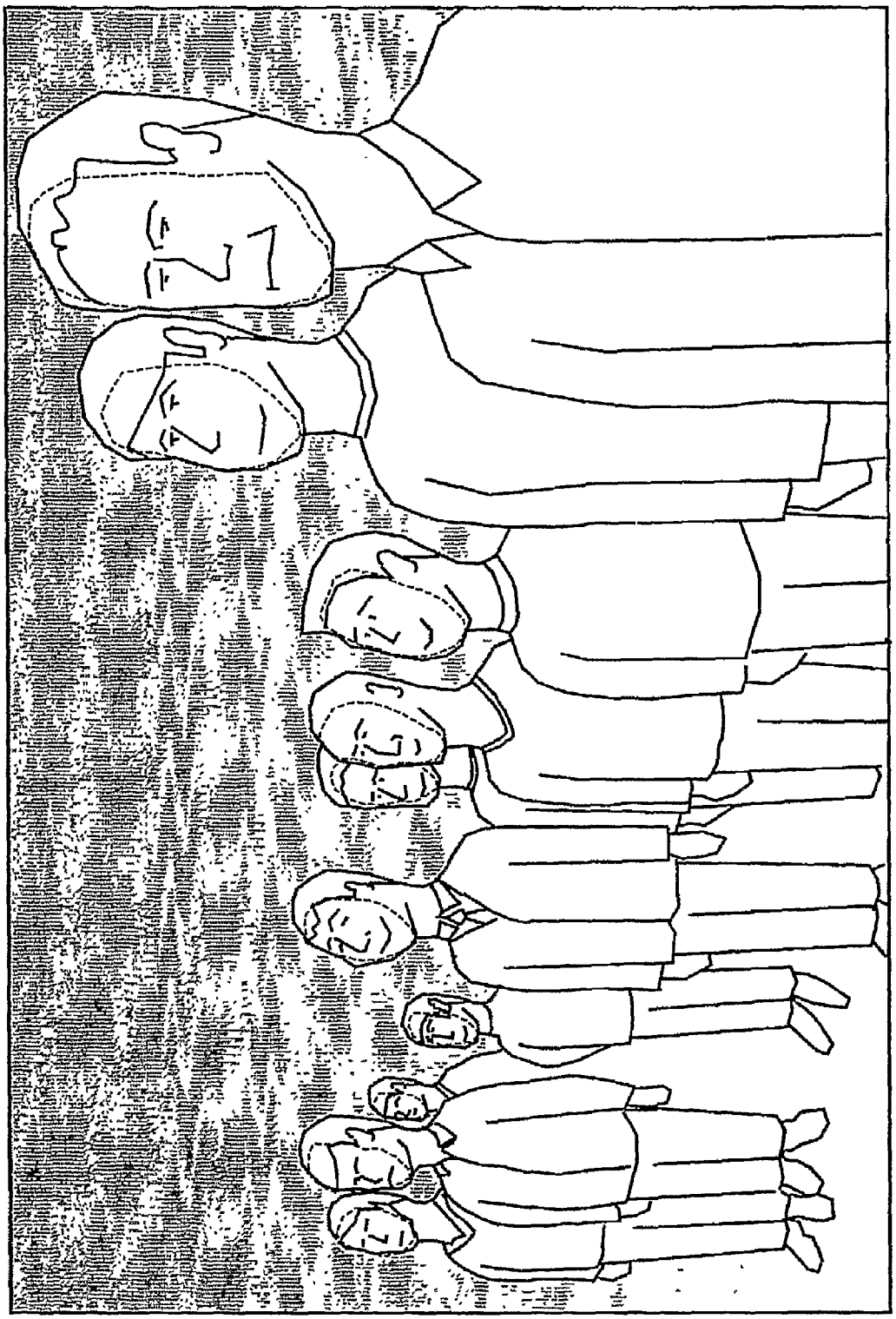
FIG. 2 is an infrared image of an audience being scanned by a laser projector.

In the IR photo shown in FIG. 2, faces in the rear are obviously much smaller than those close to the camera. Beyond a certain distance, faces that are small are also so far away that it is permissible to directly scan them with the laser. This is so, because the laser beam spreads out as it travels, so that the spread of the laser beam also results in a decreased power density by the square of the distance. Therefore, the face detection system only needs to see faces down to a certain size. The exact limit would depend on the laser's power and divergence, and has yet to be determined.

Figure 5:
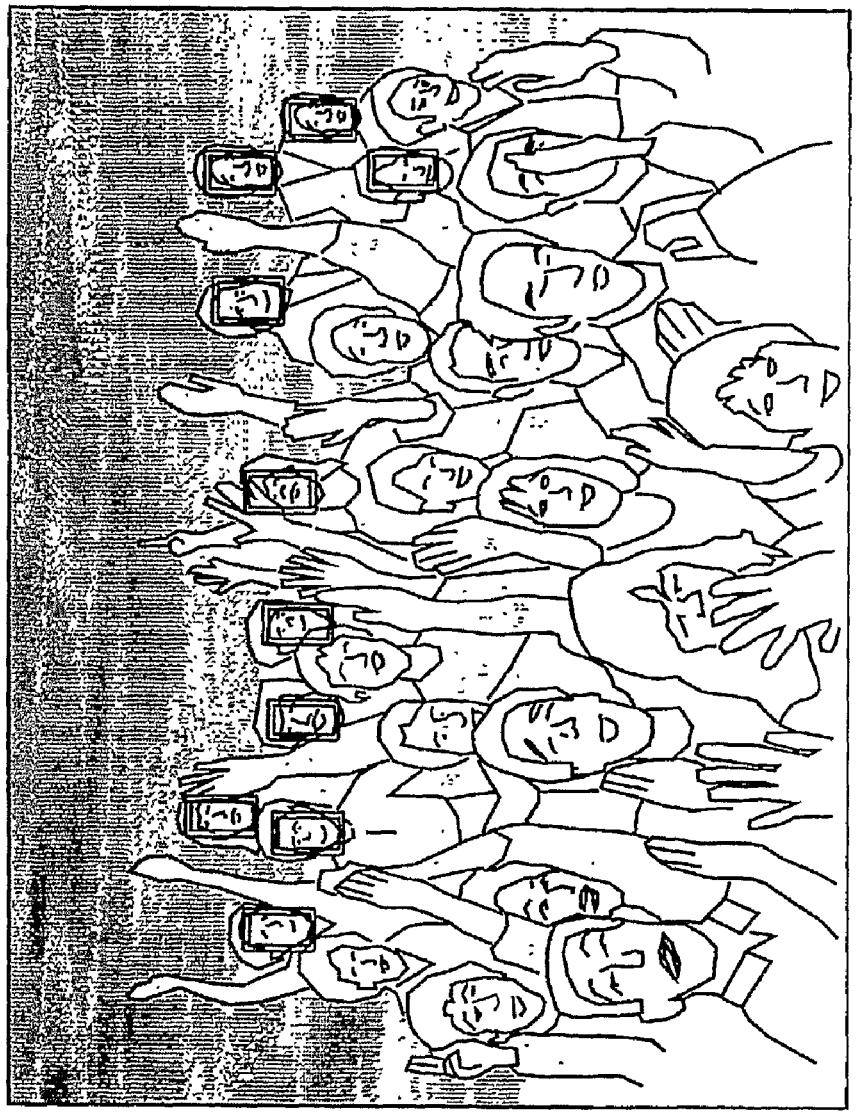
FIG. 5 is an image of an audience being scanned by a laser projector, wherein the yellow boxes show areas of 40×50 pixels and the red boxes show areas of 20×25 pixels.
Figure 6:
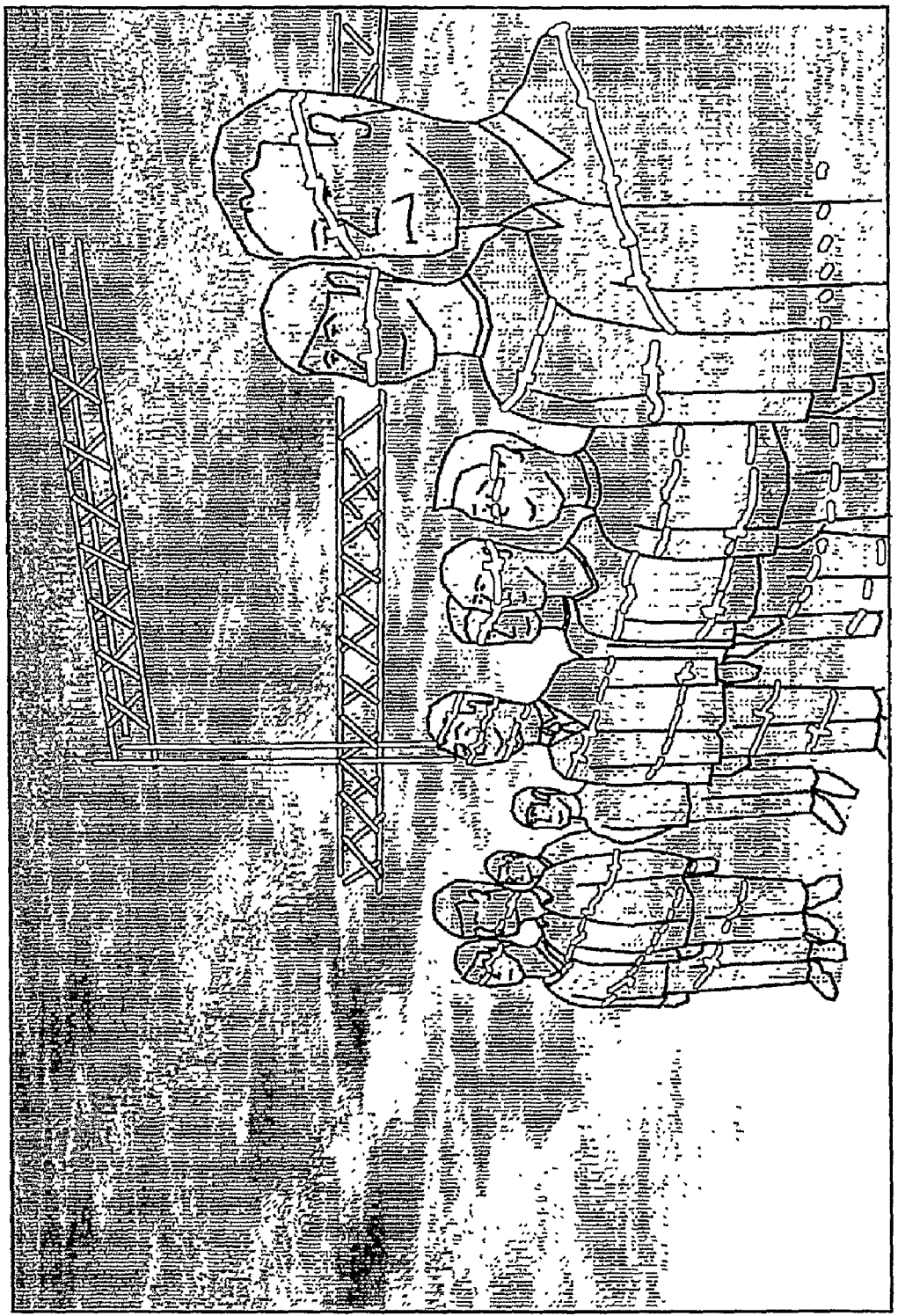
FIG. 6 is a visible light image of the IR image shown in FIG. 2.

One reference source indicates that the minimum size for face detection may be somewhere around 20×25 to 40×50 pixels. The same source also makes a high-resolution surveillance camera, with a resolution of 1288×968. To provide an idea of how such a camera might work in practice, FIG. 6 shows a half-size image of a 1288×968 pixel photo, with yellow boxes indicating a 40×50 area, and red boxes indicating a 20×25 area. Of course, faces that are larger (closer) would also have to be detected in this application. FIG. 5 shows a photo in which an audience is being scanned by a laser projector, wherein the yellow boxes show areas of 40×50 pixels and the red boxes show areas of 20×25 pixels.

Figure 1:
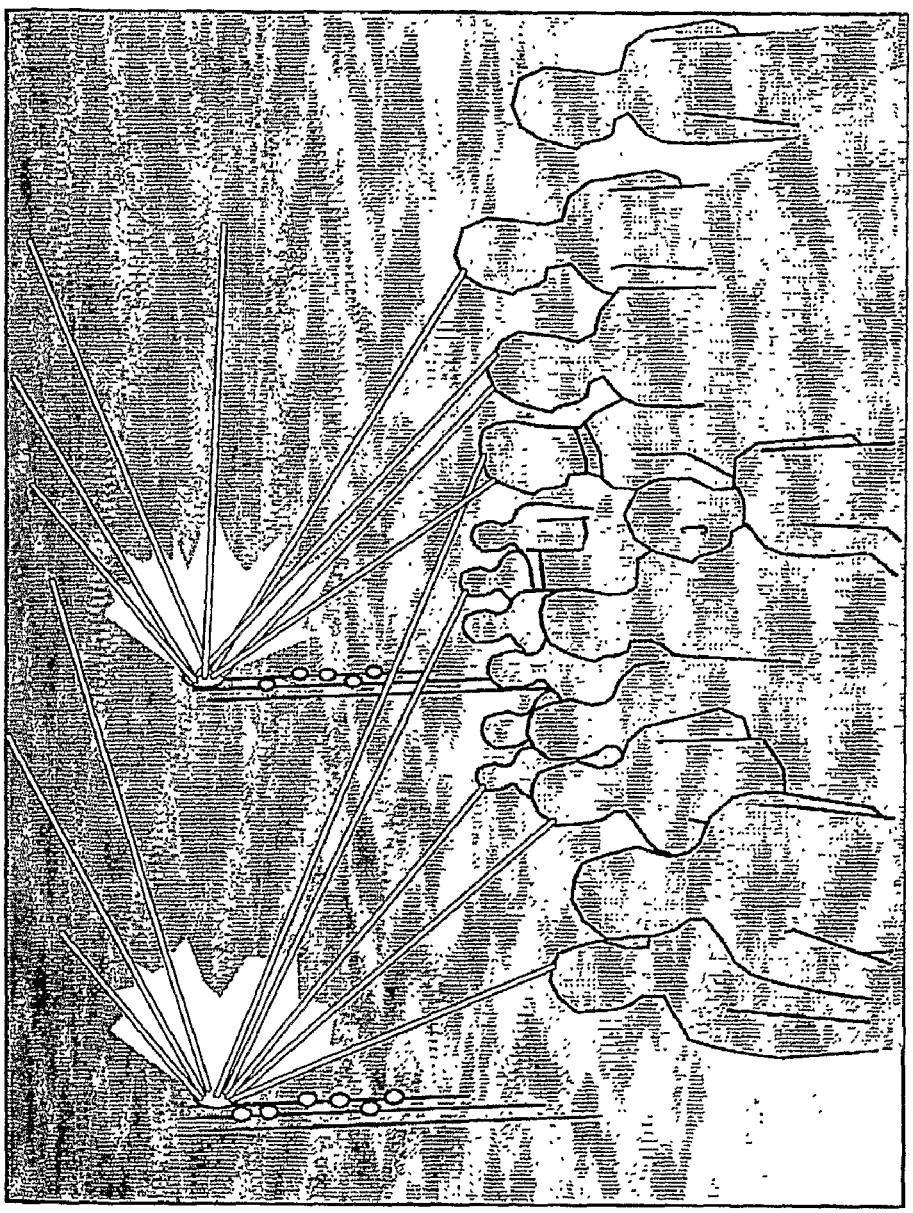
FIG. 1 is a photo of an audience enjoying a laser display show in Italy, the laser scanning directly into the audience, the photo indicating prior art.

Input to the face detection system is illustrated by FIG. 2, which shows an infrared (IR) photo of the crowd at the laser show of FIG. 1. The FIG. 2 photo is not necessarily representative of the desired IR system in the present invention, however, and is shown merely as an example. With increased illumination and a more sensitive camera, a brighter, clearer view could be obtained over that shown in FIG. 2.

Figure 3:
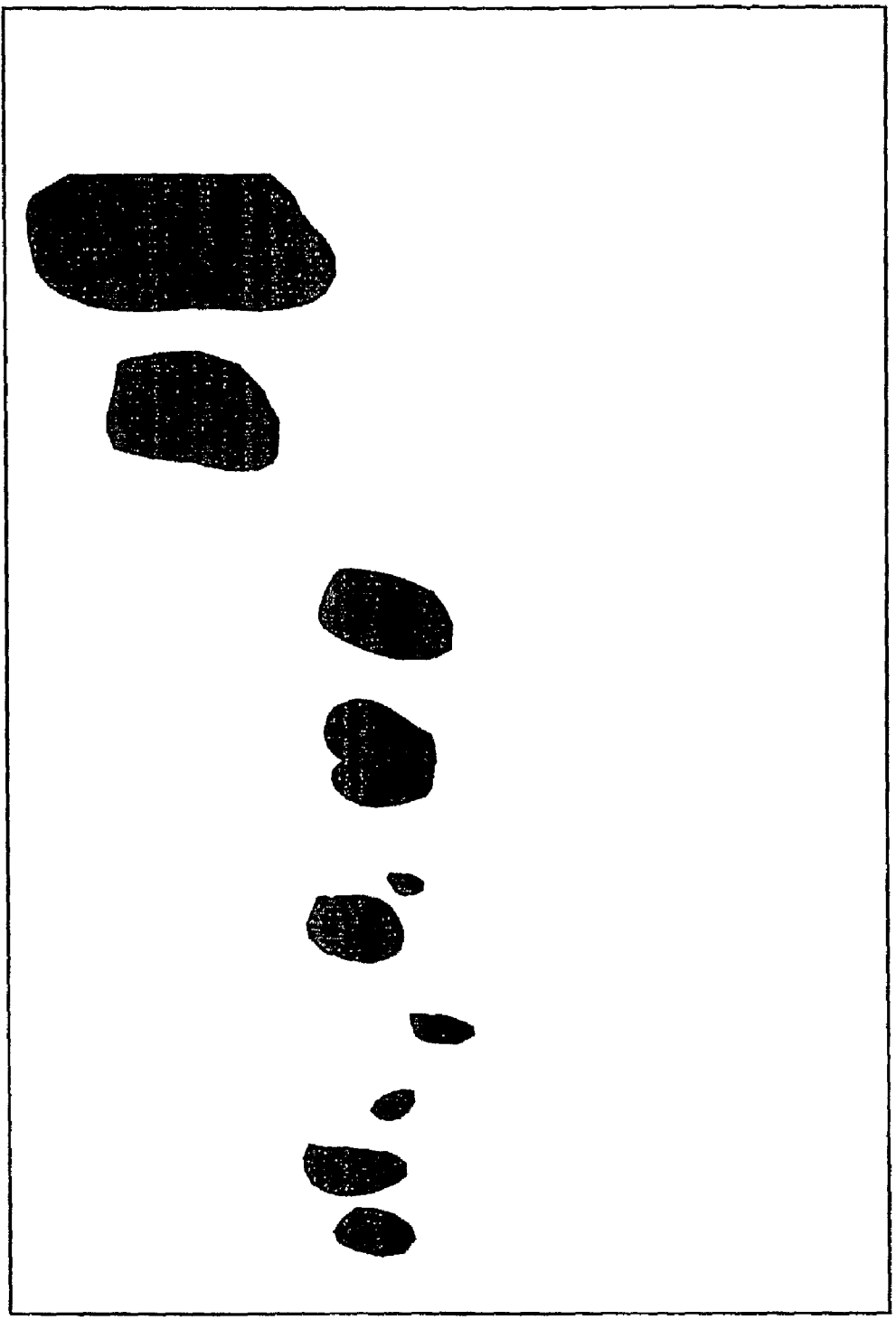
FIG. 3 shows a bitmap mask indicating where faces are found in the image of FIG. 2.
Figure 4:
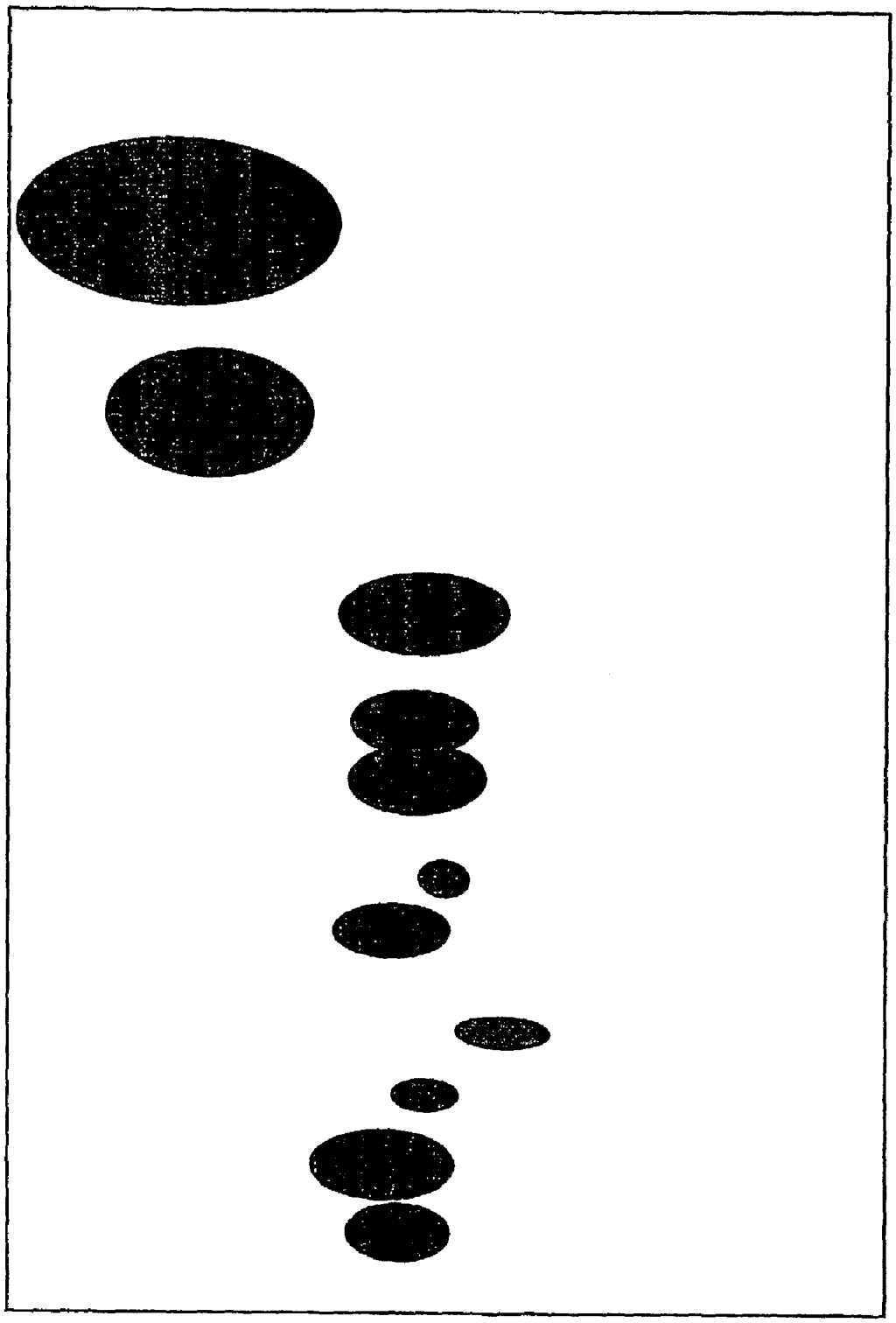
FIG. 4 is the bitmap of FIG. 3 but showing the face locations as elliptical areas.

The output of the face detection system is preferably a bitmap "mask" showing where faces are located in the audience. For example, FIG. 3 shows a mask of the IR photo shown in FIG. 2. The mask does not have to be highly detailed, or contour-accurate. It could simply be ellipses centered on the detected face, as shown in FIG. 4. It could also comprise a set of coordinates such as a bounding box. We can then develop the bitmap mask from that information. However generated, the mask is then fed into other parts of the laser system so as to reduce the beam power.

Figure 7:
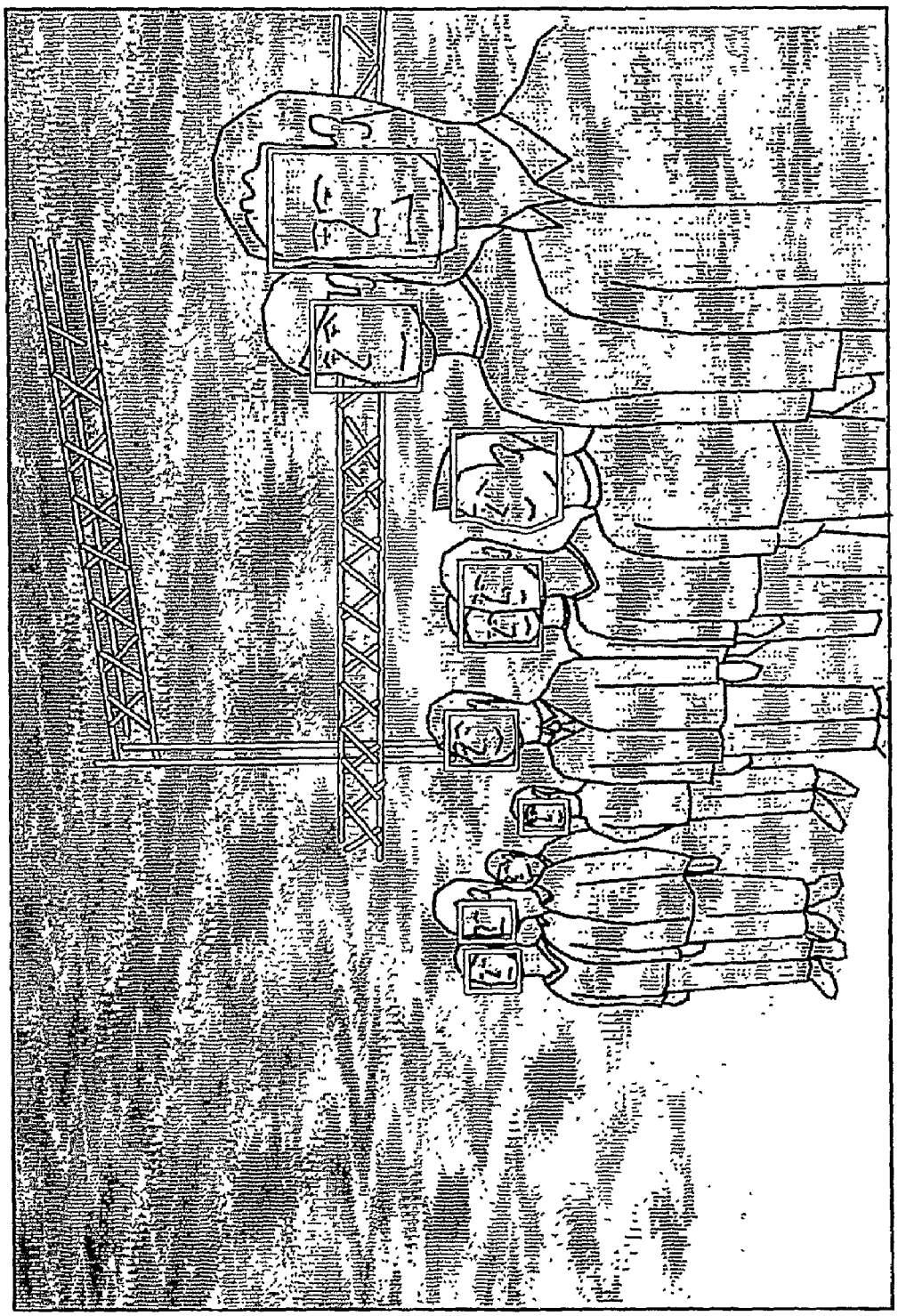
FIG. 7 shows an image of an audience processed through a face recognition program according to an embodiment of the invention.
Figure 8:
FIG. 8 shows an image of another audience processed through the same face recognition program.

The Robotics Institute at Carnegie Mellon University has made available a face detection program on line. As part of this invention, representative audience images were processed through this on line service. Results are shown in FIGS. 7 and 8. Faces detected are shown by open rectangles; false positives, that is, a face detected where there is no face, are shown by closed squares; and arrows indicate faces that were not detected, that is, false negatives.

An important element of the present invention includes the use of a camera, in order to image the audience who is watching a laser show. The camera's image is fed to a computer which then does facial detection in order to find the areas in the image where faces occur. Note that this is not facial recognition and that there is no need to identify who a particular person is. The camera is preferably of the television type, although it could be a still camera if the audience is not free to move about.

The camera preferably images the audience using IR or other non-visible light. This is to avoid imaging the audience when the laser is on them, that is, the visible laser light may confuse the vision system. However, the camera could also filter out any visible light so that the laser light is not present in the image taken, or is dimmed enough not to interfere with the face detection process. The camera could also employ unfiltered visible light, that is, take a standard camera image, by taking images of the audience when the laser is turned off or is not aimed at the audience.

The camera would be best located close to the laser projector, the closer, the better. There are two general approaches to accomplishing this. One way is to locate the camera close to the exit point (beam emission point) of the laser projector. This can be done directly, by placing the camera close to the point, or indirectly, by using a mirror which reflects the image into the camera. The advantage of the mirror system is that the mirror might be placed closer to the laser exit point. Another approach is to have the imaging camera arranged coaxially with the laser beam. In this embodiment, a mirror is placed in the optical path of the projector, so it can image the area to be scanned by the laser beam. The mirror is transparent to laser light but reflects light viewed by the camera (for example, infrared). The mirror's reflection is then directed into the camera, so that the camera is then seeing exactly the view of the laser beam. Note that there may be other variations on this, for example, the mirror can be partially transparent to wavelengths emitted by the laser light, and partially transparent to the wavelengths detected by the camera. Also, the mirror can reflect the laser light but be transparent to the wavelengths detected by the camera.

There is more than one way to implement the coaxial alignment of camera and laser projector. One method involves having the camera image a plurality of areas where the laser beam can go. This is best suited for an application where the laser can quickly go anywhere within its field of view. Another method is to have the camera image part of the area where the laser beam can go, that is, as the laser beam moves, the camera image also moves. This is best suited for an application where the beam targets specified areas, and the camera needs a more detailed or close-up view of the laser's target. One such application would be where the camera+laser system is pointed to an area, the camera does facial detection in visible light, and when the process is complete, only then the laser is allowed to fire.

The face detection system's output is preferably a bitmap with locations and sizes of the detected faces. In a simple embodiment of the invention, this is a literal bitmap where the entire bitmap (pixel area) is the same as the camera's field of view, and face areas are in one color, such as black, while non-face areas are in a contrasting color such as white. The "face detected" areas could be roughly the same shape as the face, or could merely be bounding boxes indicating that a face is inside the box. The bounding box then represents the face location and approximate size.

The resulting bitmap may be used in several ways. The bitmap may be directly used to block or reduce the laser beam from the face areas. In one embodiment of the invention, for example, an LCD panel may be placed over the laser beam output. The panel is adjusted so that its apparent size to the laser beam is the same as the apparent size of the audience. If you were at the laser beam, and the LCD panel were showing the camera view, the LCD image would appear to overlay the actual audience, as seen from the laser. The face-detected bitmap would be displayed by the LCD panel, which then would cause the apparatus to dim the laser in areas where the faces are.

The bitmap may also be used as a look-up table. The position of the laser beam is commanded or detected digitally. For each command or detection, the position of the laser is compared with the coordinates in the bitmap. If the bitmap pixel indicates a face has been detected at that location, the laser beam power is reduced or terminated. This comparison process continues until the location of the laser beam corresponds with a non-face-detected pixel, at which time the laser beam is again returned to its full power.

In the invention, however, the face detection output does not have to be in a bitmap. The face detected areas may be stored in the form of a table, for example, with entries giving the coordinates of the four corners of a bounding box. The table dimensions, or maximum camera view, is scaled to match the laser's commanded or detected position information. The laser position is then compared against the table, to determine if it falls within any of the box entries. If it does, the laser power is reduced or terminated. This comparison process continues until the location of the laser beam is not within any of the box entries.

As explained above, the camera may be one of various types, including infrared as a preferred type, but also including other non-visible wavelengths, or even visible wavelengths. An important consideration is that that the laser light from the projector not interfere with the camera's face detection process. This may be accomplished by proper selection of wavelengths, by filtering or by time-division, as further discussed below. For example, FIG. 2 is a IR image of an audience, whereas FIG. 6 is an image of the same audience taken in visible light, which shows the interfering laser light.

In using wavelengths, the camera views a wavelength which is different from the laser's output. Typically, the camera would view in the infrared and the laser would be visible. In filtering, the camera would be sensitive to wavelengths emitted by the laser, but is blocked from seeing those wavelengths, or has the laser visibility considerably reduced, by means of a filter which blocks or attenuates the laser light. Time-division involves a camera sensitive to wavelengths emitted by the laser. Therefore, to avoid having the laser light disrupt the face detection process, the camera captures the audience while the laser beam is off. This requires coordination between the laser power/brightness control signals and the face detection software, so that detection is performed when the laser beam is off.

The skilled will recognize that there are many television-type cameras presently on the market which would work well in the invention. A preferred camera system would include a high-resolution camera such as sold for surveillance applications, the camera being sensitive to infrared light. LED illuminators may be used as necessary to provide IR illumination on the audience. An example of a camera which meets these specifications and which, in fact, includes built-in LED illuminators is a Sony ⅓" Super HAD CCD sensor with 102 IR LEDs, and provides 400 lines of resolution at 0 lux (darkness). Other desirable features of this camera include an auto gain control, auto iris, and wireless transmission of the camera image.

Those skilled in the art will also readily recognize that a laser beam is one type of directed energy. Accordingly, the disclosed invention and its principles are equally applicable to any beam of energy, whether that beam be light energy or some other form of energy, whether the beam is a directed, coherent beam or whether the energy is radiated in all directions.

Accordingly, in the drawings and specification there have been disclosed typical preferred embodiments of the invention and, although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as recited in the appended claims.

That which is claimed:

1. An audience scanning laser display projector comprising:
    a laser projector capable of generating a laser beam output having a predetermined beam path, scan area and beam wavelength;
    a beam position sensor associated with said laser projector;
    a camera capable of capturing an image of the audience using light of a wavelength other than the beam wavelength, said camera disposed relative to said laser projector so that the captured image includes the area scanned by the laser beam;
    a processor operably connected with said laser projector, said beam position sensor and said camera, said processor generating a table corresponding to the camera image of the audience, and containing software capable of identifying location of faces in the audience image and comparing face locations with beam position so as to signal said laser projector to attenuate the beam when scanning over a face location: and
    an LCD panel positioned in the beam path and operably connected to said processor, said LCD panel displaying a representation of the audience image according to the table and capable of causing a portion of the LCD panel corresponding to a face location to become sufficiently obscured so as to reduce or prevent passage of the beam therethrough.

2. An apparatus comprising:
    an energy source capable of generating a beam of directed energy having predetermined beam path, scan area and beam wavelength;
    a beam position sensor associated with said energy source;
    a camera capable of capturing an image of the scan area using energy of a wavelength other than the beam wavelength, said camera disposed relative to said energy source so that the captured image includes the area scanned by the directed beam of energy;
    a processor operably connected with said energy source, said beam position sensor and said camera, said processor generating a table corresponding to the camera image of the scan area, and containing software capable of identifying location of humans in the scan area image and comparing human locations with beam position and responsive to the comparison to signal said energy source to modulate the beam: and
    an LCD panel positioned in the beam path and operably connected to said processor, said LCD panel displaying a representation of the scan area image according to the table and capable of causing a portion of the LCD panel corresponding to a human location to become sufficiently obscured so as to reduce or prevent passage of the beam therethrough.

* * * * *